(12) United States Patent
Stafford et al.

(10) Patent No.: US 9,923,847 B1
(45) Date of Patent: Mar. 20, 2018

(54) IN-CALL SERVICES USING PRESENCE

(71) Applicant: AT&T Intellectual Property I, L.P., Atlanta, GA (US)

(72) Inventors: Matthew Wayne Stafford, Austin, TX (US); Min Lu, Holmdel, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/373,881

(22) Filed: Dec. 9, 2016

(51) Int. Cl.
| H04W 4/14 | (2009.01) |
| H04L 12/58 | (2006.01) |
| H04W 4/12 | (2009.01) |
| H04W 76/02 | (2009.01) |
| H04L 29/06 | (2006.01) |
| H04M 1/725 | (2006.01) |

(52) U.S. Cl.
CPC ........ H04L 51/043 (2013.01); H04L 65/1006 (2013.01); H04M 1/72547 (2013.01); H04W 4/12 (2013.01); H04W 76/021 (2013.01)

(58) Field of Classification Search
CPC ....... H04W 4/02; H04W 84/12; H04W 40/02; H04W 4/14; H04L 65/1006; H04L 65/1069; H04L 45/22; H04L 65/4069; H04L 65/1016
USPC ................... 455/466; 370/352; 709/229, 230
See application file for complete search history.

(56) References Cited

U.S. PATENT DOCUMENTS

| 9,065,970 | B2 | 6/2015 | Martinez et al. |
| 9,106,671 | B2 | 8/2015 | Klein et al. |
| 9,338,634 | B2 | 5/2016 | Gomez Dias et al. |
| 9,372,963 | B2 | 6/2016 | Lau et al. |
| 2005/0033852 | A1* | 2/2005 | Tenhunen ............ G06Q 10/107 709/229 |
| 2011/0165857 | A1 | 7/2011 | Pihlajamaki et al. |
| 2012/0096115 | A1 | 4/2012 | McColgan et al. |
| 2013/0097123 | A1 | 4/2013 | McColgan et al. |
| 2013/0205228 | A1 | 8/2013 | Fullea Carrera et al. |
| 2014/0280586 | A1 | 9/2014 | Hoffman et al. |
| 2014/0372557 | A1 | 12/2014 | Buckley et al. |
| 2015/0081769 | A1 | 3/2015 | Mandyam et al. |
| 2016/0219093 | A1* | 7/2016 | Gangadharan ...... H04L 65/1006 |
| 2016/0248814 | A1 | 8/2016 | Mufti et al. |

OTHER PUBLICATIONS

GSM Association, "Rich Communication Suite 6.0 Advanced Communications Services and Client Specification," Version 7.0—final draft dated Feb. 19, 2016, GSM Association. Retrieved on Sep. 23, 2016, pp. 1-145.

(Continued)

*Primary Examiner* — Phuoc H Doan
(74) *Attorney, Agent, or Firm* — Amin, Turocy & Watson, LLP

(57) ABSTRACT

A presence-based capability discovery mechanism for in-call services in the rich communication services (RCS) release 6 suite of services is provided. A method can comprise receiving a unique identifier representing a communication between a first user device and a second user device, the unique identifier comprising a concatenation of a first string, a second string, and a third string, as a function of the second string, performing a look up of a first presence tuple associated with the first user device; and associating the unique identifier to first presence tuple.

20 Claims, 10 Drawing Sheets

(56) References Cited

OTHER PUBLICATIONS

GSM Association, "Rich Communication Suite 6.0 Advanced Communications Services and Client Specification," Version 7.0—final draft dated Feb. 19, 2016, GSM Association. Retrieved on Sep. 23, 2016, pp. 146-290.

GSM Association, "Rich Communication Suite 6.0 Advanced Communications Services and Client Specification," Version 7.0—final draft dated Feb. 19, 2016, GSM Association. Retrieved on Sep. 23, 2016, pp. 291-434.

GSM Association, "Rich Communication Suite 6.0 Advanced Communications Services and Client Specification," Version 7.0—final draft dated Feb. 19, 2016, GSM Association. Retrieved on Sep. 23, 2016, pp. 435-581.

* cited by examiner

IN-CALL SERVICES USING PRESENCE

TECHNICAL FIELD

The disclosed subject matter relates to providing a presence-based capability discovery mechanism for in-call services. For example, the presence-based capability discovery mechanism can be applied to rich communication services (RCS), such as release 6 of the RCS suite of services.

BACKGROUND

Presence-based capability discovery is currently not supported for the full suite of service included in RCS. RCS release 6 supports "in-call services" wherein content can be shared in the context of a telephone call. However, when capability discovery via presence is used, ambiguity can arise in multi-device scenarios. Capability discovery is used to determine which in-call services to offer (e.g., which service icons to illuminate on an end-user's graphical user interface operational on a user device, although user experience details can vary from one device implementation to another).

DETAILED DESCRIPTION

Figure 1:
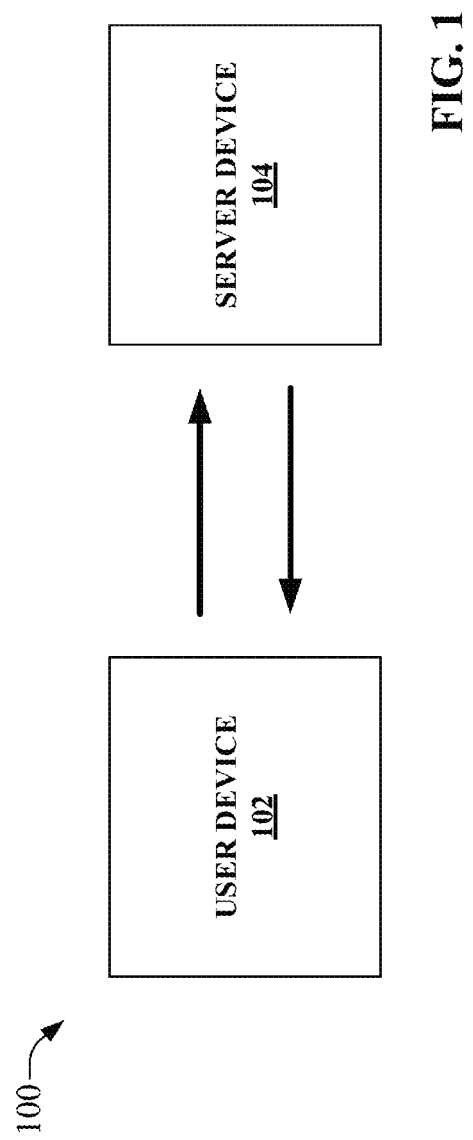
FIG. 1 is an illustration of a system for providing a presence-based capability discovery mechanism for in-call services in the Rich Communication Services (RCS) Release 6 suite of services, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

It should be realized and appreciated by those of ordinary skill that the foregoing non-limiting example application is merely an illustration of a use of the disclosed and described solution and is provided only for the purposes of exposition. The described and disclosed subject matter is therefore not limited to the foregoing example application, but can find applicability in other more generalized circumstances and use applications.

It is noted at the outset that in-call services that are currently defined in the suite of RCS release services are video share and image share, as well as shared sketch and shared map. Typically, in-call service use cases apply primarily to calls that are initiated as voice-only calls, but calls that are initiated via video calls should also be considered in various embodiments.

The disclosed systems and methods, in accordance with an embodiment, provide a system, apparatus, or device comprising: a processor; and a memory that stores executable instructions that, when executed by the processor, facilitate performance of operations. The operations can comprise initiating a communication with a user device; generating a unique identifier representing the communication, the unique identifier comprising a concatenation of a first string, a second string, and a third string; and sending the unique identifier to a server device.

Additional operations can comprise facilitating a lookup of a presence tuple associated with the user device as a function of a public user identity value associated with user device; facilitating association of the unique identifier with a presence tuple associated with the user device; and facilitating association of the unique identifier with a presence tuple associated with the device. Further operations comprise extracting the first string from a session initiation protocol invite transaction header; extracting the second string from call setup data; extracting the third string from call setup data; and facilitating activation of an icon representing an in-call service functionality that is shared between the device and the user device.

In accordance with a further embodiment, the subject disclosure describes a method, comprising a series of acts that can include: receiving, by a system comprising a processor, a unique identifier representing a communication between a first user device and a second user device, the unique identifier comprising a concatenation of a first string, a second string, and a third string; as a function of the second string, performing, by the system, a look up of a first presence tuple associated with the first user device; and associating, by the system, the unique identifier to first presence tuple.

In accordance with a still further embodiment, the subject disclosure describes a machine readable storage medium, a computer readable storage device, or non-tangible machine readable media comprising instructions that, in response to execution, cause a computing system comprising at least one processor to perform operations. The operations can include: initiating a communication with a user device; generating a unique identifier representing the communication, the unique identifier comprising a concatenation of a first string, a second string, and a third string; and sending the unique identifier to a server device.

Now with reference to the Figures, FIG. 1 illustrates a system 100 that in accordance with various embodiments provides a presence-based capability discovery mechanism for in-call services in a Rich Communication Services (RCS) system. System 100 can include user device 102 that can be in wired and/or wireless communication with a server device 104. User device 102, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise user device 102 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, consumer and/or industrial appliances and/or instrumentation associated with automotive vehicles, industrial and/or consumer appliances and/or instrumentation associated with aerospace vehicles and/or satellites orbiting in low earth orbit, geosynchronous orbit, and the like.

Similarly, server device 104, for purposes of elucidation, can comprise any type of mechanism, machine, device, facility, apparatus, and/or instrument inclusive of a processor, and/or is capable of effective and/or operative wired and/or wireless communication with a network topology. Illustrative mechanisms, machines, apparatuses, devices, facilities, and/or instruments can include server class computing machines and/or databases, tablet computing devices, handheld devices, laptop computers, notebook computers, desktop computers, cell phones, smart phones, consumer appliances and/or instrumentation, industrial devices and/or components, devices and/or appliances associated with aerospace vehicles, consumer devices and/or components associated with automotive vehicles, handheld devices, personal digital assistants, multimedia Internet enabled phones, multimedia players, and the like.

Currently when a user device, such as user device 102, initiates communication with a first remote user device or a first far end user device (e.g., a device with similar, though not necessarily identical, in-call functionalities as user device 102) using for example, a soft phone communication client (SCC) that supports, for example, the in-call service of shared sketch; once the communication between user device 102 and the first remote user device has been established, the soft phone communication client can facilitate publishing of the fact that it supports the shared sketch in-call service to server device 104.

When a second remote user device or a second far end user device (e.g., another device with similar, though not necessarily identical, in-call functionalities as user device 102) initiates a call with user device 102 (e.g., without utilizing facilities and/or functionalities provided by the soft phone communication client operational on user device 102), the second remote user device can erroneously determine or conclude, based on records maintained by server device 104 and/or the previously published fact that the first remote user device when it was in prior communication with user device 102, that user device 102 will be (or still is) capable of providing support for the shared sketch in-call service in the context of a call between user device 102 and the second remote user device, since (a) there can be a latency period of time during which artifacts associated with the first call between user device 102 and the first remote user device and a newly established reality associated with the second call between the second remote user device and user device 102 can persist and be simultaneously active and coexist; (b) when the first call is initiated between user device 102 and the first remote user device the first call is, in furtherance of the foregoing example, being facilitated through a soft phone communication client operating on user device 102 which supports, for instance, the shared sketch in-call service (which may not be the case when the second call is directly initiated between the second remote user device and user device 102 (e.g., the soft phone communication client operational on user device 102 is not necessarily being utilized)); and (c) the second remote user device, since it too can support the shared sketch in-call service, can have erroneously determined or concluded, based on the earlier established call between user device 102 (facilitated using the soft phone communication client) and the first remote user device, that user device 102 supports the shared sketch in-call service capability as well; when in fact user device 102, without the functionalities and facilities provided, for example, by the soft phone communication client operational on user device 102, does not, in this instance, support the shared sketch in-call service.

When queried, presence-based capability discovery procedures typically generate and produce aggregated presence documents (e.g., in multi-device scenarios the presence server device (e.g., server device 104) returns a union of the capabilities published by disparate devices (e.g., user device 102) that share the same IP Multimedia Subsystem (IMS) public user identity (PUID)—a unique identifier, such as a telephone number). The fact that multiple disparate devices can be sharing a single PUID can be obscured from a user device, such as user device 102 or a far end user device, requesting presence data via a session initiation protocol (SIP) subscribe query. For instance, in the context of scenario outlined above, when a second remote user device (e.g., a device with similar, though not necessarily identical, in-call functionalities as user device 102) directly initiates a call with user device 102 (e.g., without utilizing facilities and/or functionalities provided by a soft phone communication client operational on user device 102) the second remote user device, on requesting presence data from a presence server device (e.g., server device 104) via submission of a session initiation protocol subscribe query can erroneously determine or conclude, based on records maintained by server device 104, that user device 102 can support an in-call service in the context of a call between user device 102 and the second remote user device, when in actuality the user device 102 is not capable of providing the indicated in-call service.

While the foregoing ambiguity can, in principle, be overcome through the use of globally routable user agent URIs (GRUUs), this approach is not necessarily pragmatic since some user devices do not necessarily support globally routable user agent URIs, and if different/disparate user devices sharing the same SIP Address-of-Record (AoR) publish capabilities using their globally routable user agent URIs, the presence server device (e.g., server device 104) will not aggregate the capabilities into a single presence document. To achieve aggregation, each user device would therefore have to publish a separate presence document using the SIP AoR. Moreover, the initiator of the query to the presence server device would have to address the query to the globally routable user agent URI for in-call services, but to the AoR in all other use instances.

System 100 therefore does not depend on globally routable user agent URIs. Instead, system 100, for each supported in-call service, adds or associates a unique identifier to the telephone/video call represented as presence tuple maintained on server device 104, wherein the presence tuple indicates support for one or more in-call service. In accordance with an embodiment, the unique identifier associated with the presence tuple can be denoted as "In-Call-If-Match."

The identifier can represent a concatenation of three character strings (1) a first character string in the form of: "CallId=" followed by a value of the CallId shared in the SIP INVITE transaction header that initiates a call between, for instance, user device 102 and a first remote user device; (2) a second character string in the form of: "To=" followed by the value of the To header that can have been extracted from call setup data; and (3) a third character string in the form of: "From=" followed by the value of the From header that can have been extracted from the setup data, interspersed, for example, with a delimiter (e.g., white space, a special character, etc.). For instance, where a call is initiated between user device 102 and a first remote user device, the first character string can be: "CallId=<cid_bob_alyssa>", wherein, for purposes of exposition, "bob" represents a value associated with user device 102 and "alyssa" represents a value associated with the first remote user device; the second character string can be: "To=<alyssa_puid>", wherein "puid" represents the public user identity associated with the first remote user device "alyssa"; and the third character string can be" "From=<bob_puid>" representative of the public user ID associated with user device 102. Thus in this instance, the value of the unique identifier denoted as "In-Call-If-Match", can, for example, be "CallId=<cid_bob_alyssa>; To=<alyssa_puid>; From=<bob_puid>", which can be associated with a presence tuple stored at server device 104. It should be noted in regard to the foregoing unique identifier, "In-Call-If-Match", that the delimiter used is ";", however as will be appreciated by those of ordinary skill, any character can be utilized for this purpose. For instance and in accordance with an aspect, the delimiter used can be: a colon ":". In an additional aspect, the delimiter used can be: a vertical bar "|". In a further aspect, the delimiter can be represented as: a caret "A". The presence tuple stored to server device 104 can represent the in-call service(s) that can be available for use on user device 102 and/or the remote user device (e.g., the first remote user device). For example, the presence tuple stored to server device 104 in one instance can record the fact that user device 102 has the capability to provide one or more in-call service comprising image share, video share, shared sketch, and shared map. Similarly, in the context of the remote user device (e.g., the first remote user device) server device 104 can store a presence tuple that indicates that the remote user device has capabilities of providing one or more of video share, image share, shared map, and shared sketch.

It should be noted in the context of the foregoing, that where there are a group of devices that use a common public user identifier and each device comprising the group of devices is capable of providing support for similar in-call services, identical in-call services, a grouping of at least one in-call service, or a sub-grouping of in-call services, each device comprising the group of devices can have a separate and/or distinct presence document and/or presence tuple stored or persisted to server device 104. For instance, where a public user identifier is associated with a smart phone device that provides support, through, for example, a soft phone communication client, for the video share and shared map in-call services, a presence document and/or a presence tuple can be maintained by server device 104 in regard to this smart phone device. Similarly, where the same smart phone device, without the facilities and functionalities provided by the soft phone communication client, does not support the shared map in-call feature, a distinct and separate presence document and/or presence tuple can be maintained and/or stored to server device 104. Further, where a tablet computing device, for instance, that does not support any of the shared in-call features, is associated with the public user identifier, another distinguishable presence document and/or presence tuple can be stored to, or maintained by, server device 104.

Thus, when user device 102 initiates contact with a far end device, such as a remote user device, or when a far end device initiates contact with user device 102, a presence document or presence tuple can respectively be instantiated or created at server device 104. The respective presence documents and/or respective presence tuples associated with each of the user device 102 and the far end device can be keyed using the respective public user identifier associated with each of the communicating devices (e.g., user device 102 and the far end device). Each of the presence document and/or the presence tuple can be associated with a grouping of in-call services supported by the respective communicating devices. Additionally and or/alternatively each of the presence documents and/or the presence tuples can include or be associated with an In-Call-If-Match field that indicates that a communication is operative between user device 102 and a far end device. As has been noted earlier, the In-Call-If-Match field provides a value that uniquely identifies the communication transaction for the duration of the communication between user device 102 and the far end device, and can comprise a concatenation of: a first character string that represents the "CallId=" field included and extracted from a session initiation protocol packet header; a second character string that represents the "To=" field extracted and included the session initiation protocol packet header; and a third character string that represents the "From=" included and extracted from the session initiation protocol packet header.

Figure 2:
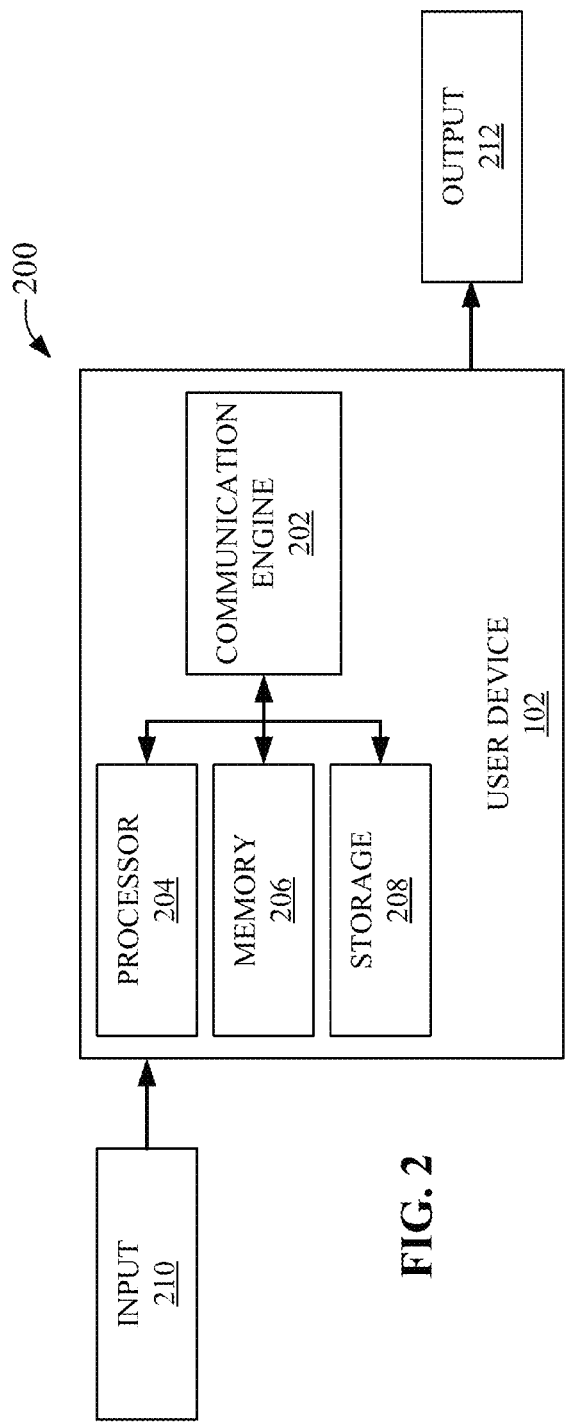
FIG. 2 is a further depiction of a further system for providing a presence-based capability discovery mechanism for in-call services, in accordance with aspects of the subject disclosure.

Turning now to FIG. 2 that depicts a system 200 that includes user device 102. System 200 can facilitate presence-based capability discovery for in-call services in a rich communication services (RCS) system. As illustrated, user device 102 can include a communication engine 202 that can be coupled to a processor 204, memory 206, and storage 208. Communication engine 202 can be in communication with processor 204 for facilitating operation of computer or machine executable instructions and/or components by communication engine 202, memory 206, for storing data and/or the computer or machine executable instructions and/or components, and storage 208 for providing longer term storage of data and/or machine and/or computer readable instructions. Additionally, system 200, and more specifically user device 102, can also receive input 210 for use, manipulation, and/or transformation by communication engine 202 to produce one or more useful, concrete, and tangible result, and/or transform one or more articles to different states or things. Further, system 200, and in particular user device 102, can also generate and output the useful, concrete, and tangible results and/or the transformed one or more articles produced by communication engine 202 and output as output 212.

As noted above, system 200, and more particularly user device 102, for purposes of elucidation, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 200 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

In accordance with an embodiment communication engine 202 can initiate a call to a far end user device or remote user device which can be accepted by the remote user device (e.g., the user using the far end user device answers the call). At this juncture, communication engine 202 can generate a unique identifier, "In-Call-If-Match", comprising a concatenation of three strings, wherein the first string is of the form "CallId=" followed by a value extracted from the SIP invite transaction header, e.g. "<cid_bob_alyssa>"; the second string is of the form "To=" followed by a value extracted from call setup data, e.g., "<alyssa_puid>"; and the third string is of the form "From=" followed by a value also extracted from the call setup data, e.g., "<bob_puid>". The result of a concatenation can be: "In-Call-If-Match: <cid_bob_alyssa>; To=<alyssa_puid>; From=<bob_puid>". This concatenated string can then be published or sent, as output 212, to a presence server device (server device 104), whereupon, the presence server device can associate the concatenated string with a presence tuple(s) that represents a suite of in-call service capabilities that can exist between the participating devices in the call (e.g., user device 102 and/or the remote far end user device). Moreover, indication of a commonality of support for an in-call service can be provided by the activation or illumination of icons or pictograms on the respective display devices associated with user device 102 and/or the remote far end user device. For example, if the presence tuple maintained at the presence server device (e.g. server device 104) indicates that both devices have the capability of providing the in-call video facility, an icon or pictogram that represents the in-call video facility can be activated or illuminated on a display device associated with each of user device 102 and/all the remote far end user device.

In accordance with an additional embodiment, communication engine 202 can receive a call from a remote user device, as input 210, whereupon a unique identifier can have been generated. The unique identifier "In-Call-If-Match", as noted earlier, can comprise a concatenation of three strings. In this instance, the first string can be "<CallId=cid_carol_bob>", the second string can be "<To=<bob_puid>", and the third string can be "<From=<carol_puid>", wherein "carol" is the name of the user operating the contacting remote user device. As also noted earlier, the value associated with CallId can have been extracted from the SIP invite transaction header that the remote user device utilized to initiate the call with user device 102, and the values associated with "To" and "From" can have been obtained from call setup data. The unique identifier "In-Call-If-Match" can then be maintained by a presence server device (e.g., server device 104) in conjunction with a presence tuple that represents the suite of in-call service capabilities that can exist between the participating devices (e.g., user device 102 and/or remote far end device).

In relation to this additional embodiment, it should be noted that when the far end user device establishes contact with user device 102, the far end device can query the presence server device (e.g., server device 104) to determine whether user device 102, has in-call capabilities. The querying of the presence server device by the far end user device can be accomplished by using an SIP subscribe transaction, wherein the SIP subscribe transaction includes a field that comprises the public user identity associated with user device 102 (e.g., in this instance the public user identity (PUID) associated with user device 102). The presence server device on receiving the SIP subscribe transaction including the PUID associated with user device 102 from the far end remote user device can perform a lookup of presence records maintained for example in an associated database to determine whether or not user device 102 is capable of facilitating in-call services, and which in-call facilities the far end remote user device and user device 102 support in common. On determining that there exists support for a commonality of in-call facilities between the far end remote user device and user device 102, the presence server device can notify both devices (e.g., user device 102 and the contacting far end remote user device) of the supported commonality of in-call facilities. When each of the devices receive the notification of the respective capabilities of the reciprocating device, icons or pictograms displayed on respective display devices can be activated or illuminated.

Figure 3:
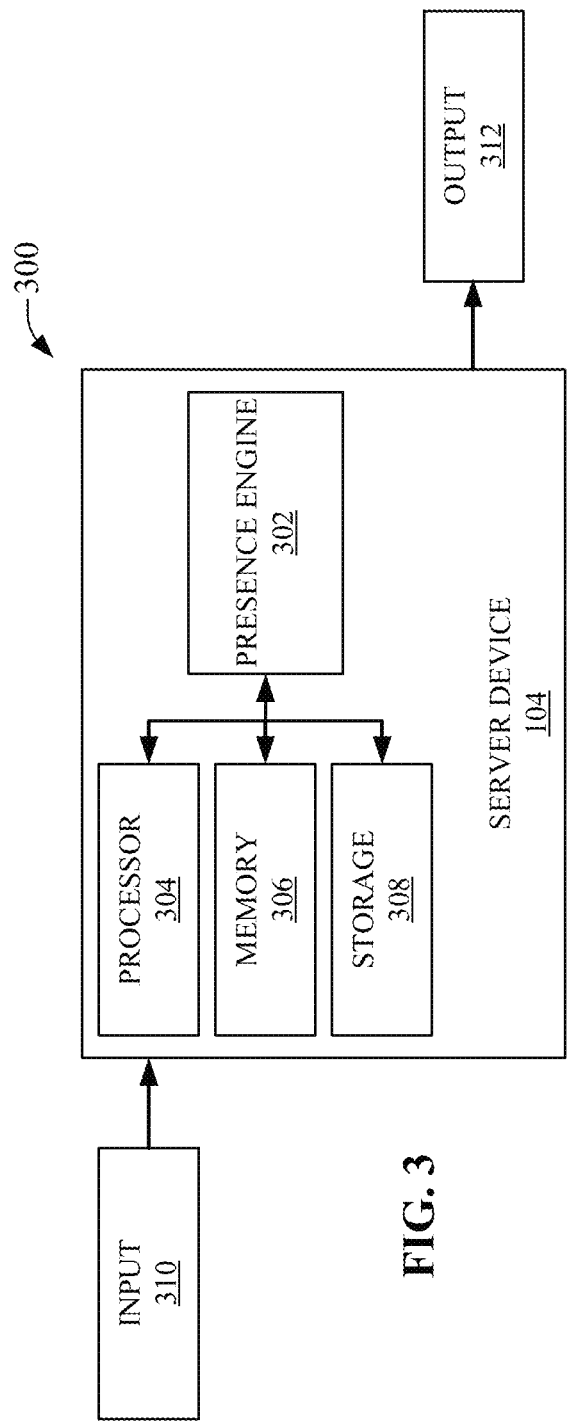
FIG. 3 provides illustration of an additional system for providing a presence-based capability discovery mechanism for in-call services, in accordance with aspects of the subject disclosure.

FIG. 3 illustrates a system 300 that includes server device 104. System 300 can facilitate presence-based capability discovery for in-call services in an RCS system. As depicted, server device 104 can include presence engine 302 that can be coupled to a processor 304, memory 306, and storage 308. Presence engine 302 can be in communication with processor 304 for facilitating operation of computer or machine executable instructions and/or components by presence engine 302, memory 306, for storing data and/or the computer or machine executable instructions and/or components, and storage 308 for providing longer term storage of data and/or machine and/or computer readable instructions. Additionally, system 300, and more specifically server device 104, can also receive input 310 for use, manipulation, and/or transformation by presence engine 302 to produce one or more useful, concrete, and tangible result, and/or transform one or more articles to different states or things. Further, system 300, and in particular server device 104, can also generate and output the useful, concrete, and tangible results and/or the transformed one or more articles produced by presence engine 302 as output 312.

As has been noted above, system 300, and more particularly server device 104, for purposes of exposition, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 300 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, etc.

In accordance with an embodiment, in response to a user device (e.g., user device 102) initiating a call to a far end remote user device, and the acceptance by the far end remote user device of the call initiated by the user device, presence engine 302 can receive as input 310 a unique identifier (e.g., "In-Call-If-Match: <cid_bob_alyssa>; To=<alyssa_puid>; From=<bob_puid>") that has been generated by the user device (e.g., user device 102). The unique identifier can comprise a concatenation of three strings, the first string is of the form: "CallId=" followed by a value extracted from the SIP invite transaction header; the second string is of the form: "To=" followed by a value extracted from call setup data; and the third string is of the form: "From=" followed by a value also extracted from the call setup data, thus forming the unique identifier: In-Call-If-Match: <cid_bob_alyssa>; To=<alyssa_puid>; From=<bob_puid>. In response to receiving the unique identifier, presence engine 302 can perform a lookup of its database(s) (e.g., memory 306 and/or storage 308, or a database of distributed databases with which server device 104 can be wirelessly and/or wirelessly in communication) to identify records (e.g., presence tuples) that can have been persisted to it in relation to the initiating user device and the accepting far end remote user device to which, presence engine 302 can have appended the unique identifier. Additionally, presence engine 302, from the records retrieved from its database(s), can determine whether or not there is a commonality of support for in-call services between the initiating user device and the accepting far end remote user device. If there is a commonality of support for in-call services, presence engine 302 can send, as output 312, indication to the respective devices (e.g., the initiating user device and the accepting far end remote user device) that there is a commonality of support for in-call services, at which point each of the initiating user device and the accepting far end remote user device can illuminate and/or activate, on their respective displays, icons and/or pictograms representative of the in-call services that are supported by each of the devices.

In accordance with a further embodiment, presence engine 302, in response to a user device (e.g., user device 102) receiving and accepting a call initiated by a far end remote user device, can, as input 310, for instance, from the far end remote user device a unique identifier (e.g., "In-Call-If-Match: <cid_carol_bob>; To=<bob_puid>; From=<carol_puid>") comprising the concatenation of at least a first string representing: "<CallId=cid_carol_bob>"; a second string representing: "<To=bob_puid>"; and a third string representing: "<From=carol_puid>", wherein the first string can have been obtained from a field included in the SIP INVITE transaction header that can have been used to initiate the call from the far end remote user device to the user device, the second string and third string can respectively have been obtained from call setup data. Presence engine 302 can thereafter associate the received unique identifier (In-Call-If-Match: <cid_carol_bob>; To=<bob_puid>; From=<carol_puid>) to one or more presence tuples that have been persisted to memory 306 and/or storage 308 or to databases of distributed databases with which server device 104 can have been wirelessly and/or wirelessly associated. For instance, the unique identifier, In-Call-If-Match: <cid_carol_bob>; To=<bob_puid>; From=<carol_puid>, can be associated with a first presence tuple associated with the initiating far end remote user device. Similarly, the unique identifier, In-Call-If-Match: <cid_carol_bob>; To=<bob_puid>; From=<carol_puid>, can be associated with a second presence tuple associated with the accepting user device (e.g., user device 102).

In an additional and/or alternative embodiment, presence engine 302 can comprise a presence network agent (PNA) that monitors the SIP INVITE transaction exchange between the two parties (e.g., To=<bob_puid>; From=<carol_puid>) and can construction the unique idenifier (e.g., In-Call-If-Match: <cid_carol_bob>; To=<bob_puid>; From=<carol_puid>). The presence network agent (PNA) then can publish the respective presence tuples for the respective far end remote user device and the accepting user device (e.g., user device 102), as described above.

Additionally, in the context of the far end remote user device initiating a call to the user device, when the far end remote user device establishes contact with the accepting user device, the far end remote user device can query presence engine 302 to ascertain whether the accepting user device has in-call capabilities. The querying of server device 104 (or more particularly presence engine 302) can be accomplished by using a SIP subscriber transaction, wherein the SIP subscriber transaction includes a field comprising at least the public user identity associated with the accepting user device. Presence engine 302 on receiving the SIP subscribe transaction including the public user identity associated with the accepting user device, as input 310, from the far end remote user device can perform a lookup of presence tuples to determine whether or not the accepting user device has capabilities of facilitating in-call services, and which in-call services the far end remote user device and the user device support in common. On determining that there exists support for a commonality of in-call service facilities, presence engine can notify, as output 312, both devices of the supported commonality of in-call service functionalities. Whereupon when each of the devices receives the notification of the respective capabilities of the reciprocating device, icons or pictograms can be displayed on respective display devices associated with each of the far end remote user device and the accepting user device which identify the commonality of supported in-cal service.

Figure 4:
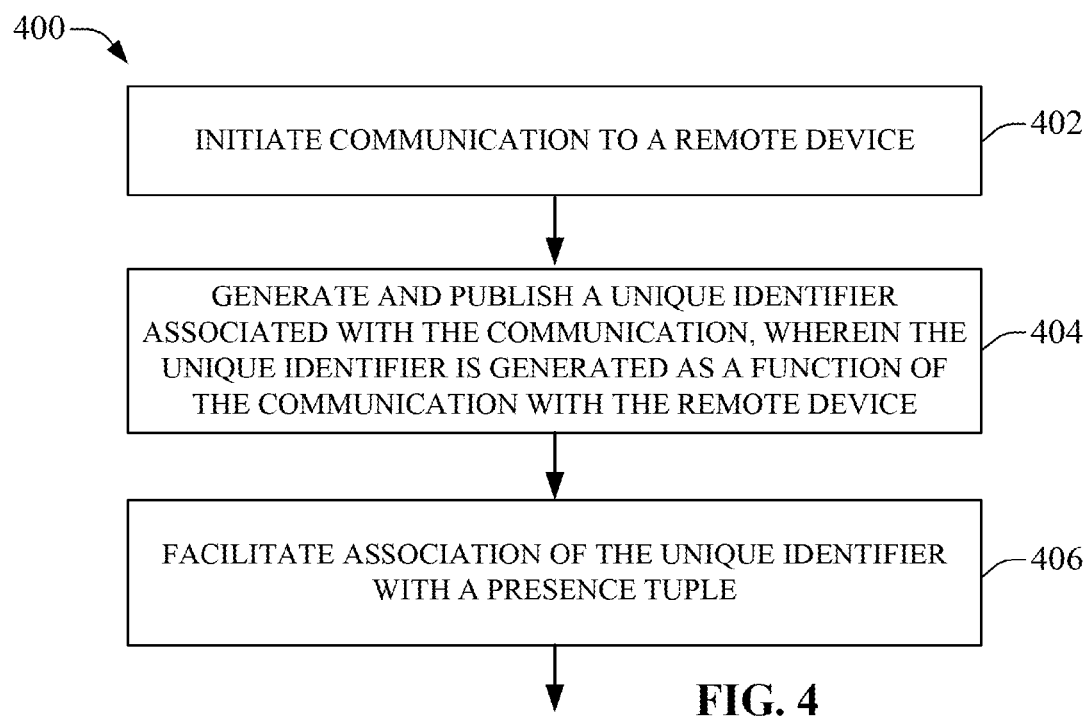
FIG. 4 provides illustration of a flow or method for providing a presence-based capability discovery mechanism for in-call services, in accordance with aspects of the subject disclosure.
Figure 5:
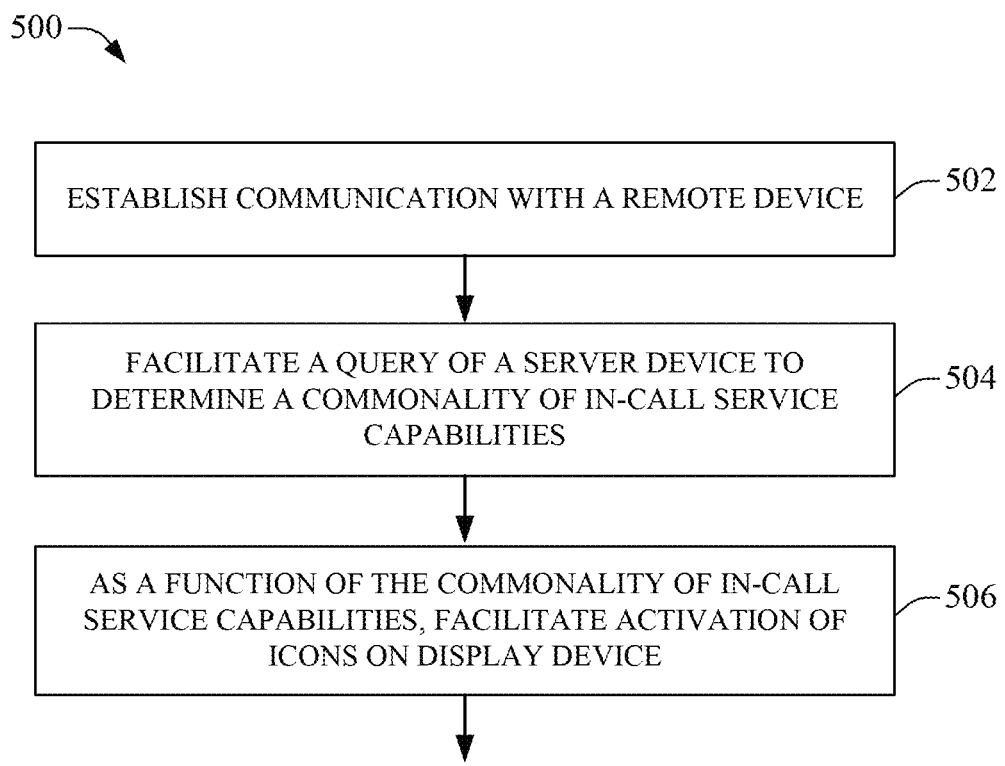
FIG. 5 illustrates another depiction of a flow or method for providing a presence-based capability discovery mechanism for in-call services, in accordance with aspects of the subject disclosure.

In view of the example system(s) described above, example method(s) that can be implemented in accordance with the disclosed subject matter can be better appreciated with reference to flowchart in FIGS. 4-5. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 4 illustrates a method 400 for providing a presence-based capability discovery mechanism for in-call services in Release 6 of the RCS suite of services. Method 400 can commence at 402 where a user device (e.g., user device 102) can initiate a communication (e.g., telephone call, video call, . . . ) to a far end remote user device. At 404 in response to the far end remote user device accepting initiation of the communication, a unique identifier (e.g., "In-Call-If-Match") can be generated and thereafter published to a server device (e.g., server device 104). On receiving the unique identifier, the server device can perform a look up (e.g., based on the respective PUIDs of the user device (e.g., user device 102) and the far end remote user device) of the respective presence tuples maintained by the server device and its associated databases. The respective PUIDs can be obtained, for example, from the second and third strings that can comprise the unique identifier (e.g., the "To=" and "From=" elements). In response to identifying the respective presence tuples for each of the user device and/or the far end remote user device, the unique identifier can be associated with each of the tuples at 406.

FIG. 5 depicts a method 500 for providing a presence-based capability discovery mechanism for in-call services in Release 6 of the RCS suite of services. Method 500 can commence at 502 where a far end remote user device can initiate communication with a user device (e.g., user device 102). Contemporaneously, or in near contemporaneity, with initiating communication with the user device can generate, as elucidated above, a unique identifier (e.g., "In-Call-If-Match") comprising a concatenation of at least three strings. The generated unique identifier can then be sent to a server device (e.g., server device 104) whereupon the server device can, as a function of the respective PUID values included in the unique identifier (e.g., the "To=" and "From=" elements) perform a lookup of presence tuples that can have been stored and maintained, for example, by database devices of a group of database devices to identify the respective in-call service capabilities supported by each of the respective initiating far end remote user device(s) and the accepting user device(s). When the server device identifies the respective presence tuples, the server device can associate the unique identifier to each of the presence tuples. In this manner, the call established between the two devices (e.g., the user device and the far end remote user device) can be uniquely identified and have a unique attribution for the duration of the communication between the devices.

At 504 the far end remote user device can facilitate a query of the server device (e.g., server device 104) to determine whether there is a commonality of supported in-call services between the initiating far end remote user device and the user device. At 506, in response to, based on, or as a function of there being a commonality of supported in-call service between the initiating far end remote user device and the accepting user device, icons or pictograms representative of each of the supported in-call services can be activated and/or illuminated on respective display devices associated with each of the initiating far end remote user device and the user device (e.g., user device 102).

Figure 6:
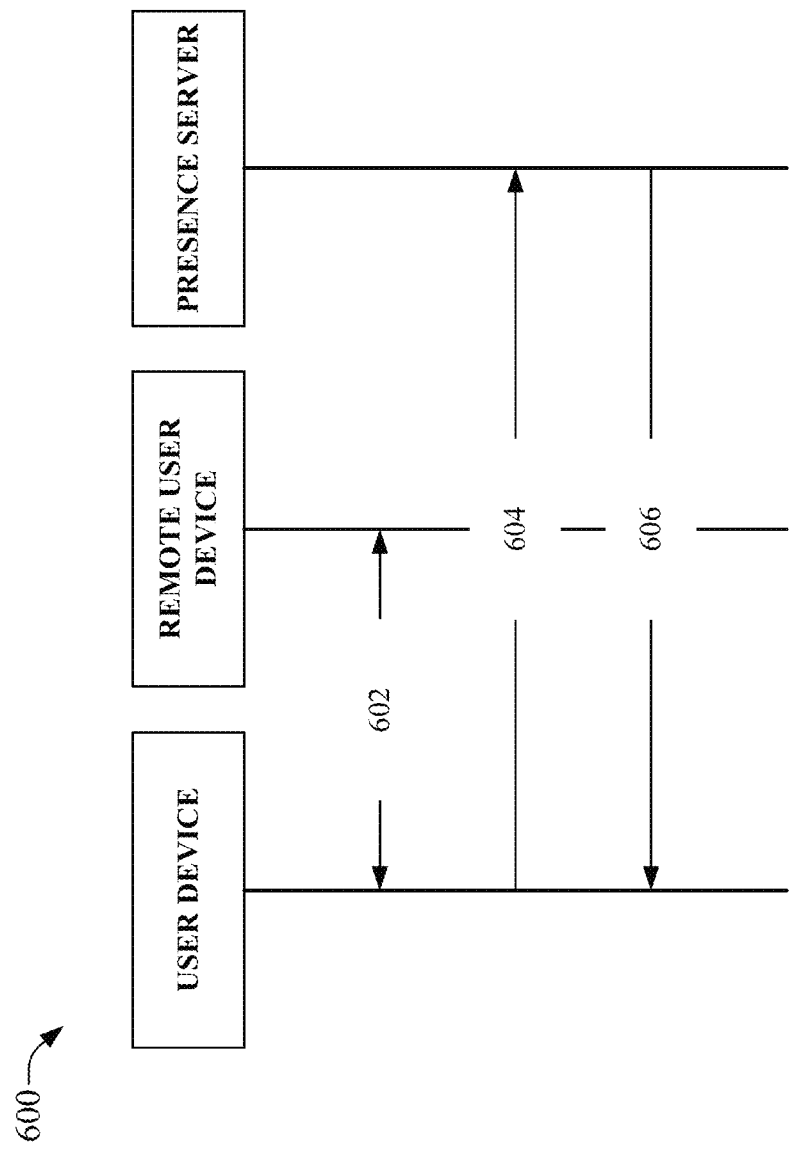
FIG. 6 provides illustration of a flow diagram or chart for providing a presence-based capability discovery mechanism for in-call services, in accordance with aspects of the subject disclosure.

FIG. 6 illustrates a flow 600 that can represent actions that can take place between a user device (e.g., user device 102), a remote device, and a presence server device (e.g., server device 104) in accordance with an embodiment. As illustrated flow 600 can commence at 602, whereupon a user device can initiate communication with a remote device. At 604, the user device can publish or send a unique value/ identifier/string (e.g., In-Call-If-Match: <cid_user_device_r- emote device>; To=<remote device_puid>; From=<user device_puid>) to the presence server device. As has been noted earlier in this description, the unique value/identifier/ string can be a concatenation of at least three strings, wherein the first string can have been extracted from the SIP invitation transaction header (e.g., "<cid_user device_r- emote device>"), the second and third strings (e.g., <remote device_puid> and <user device_puid>) can have been extracted from call setup data. The presence server device, on receiving the unique value/identifier/string can perform a lookup of presence tuples for each of the user device and remote device (e.g., using the respective PUIDs included in the fields: "remote device_puid" and "user device_puid" as respective lookup keys). On retrieving the respective presence tuples, presence server device can associate the unique value/identifier/string to each of the presence tuples. At 606 an acknowledgement can be sent back to the initiating device (e.g., the user device) at which point icons or pictograms can be activated on each of the corresponding devices to indicate which in-call services are supported by each of the communicating devices.

Figure 7:
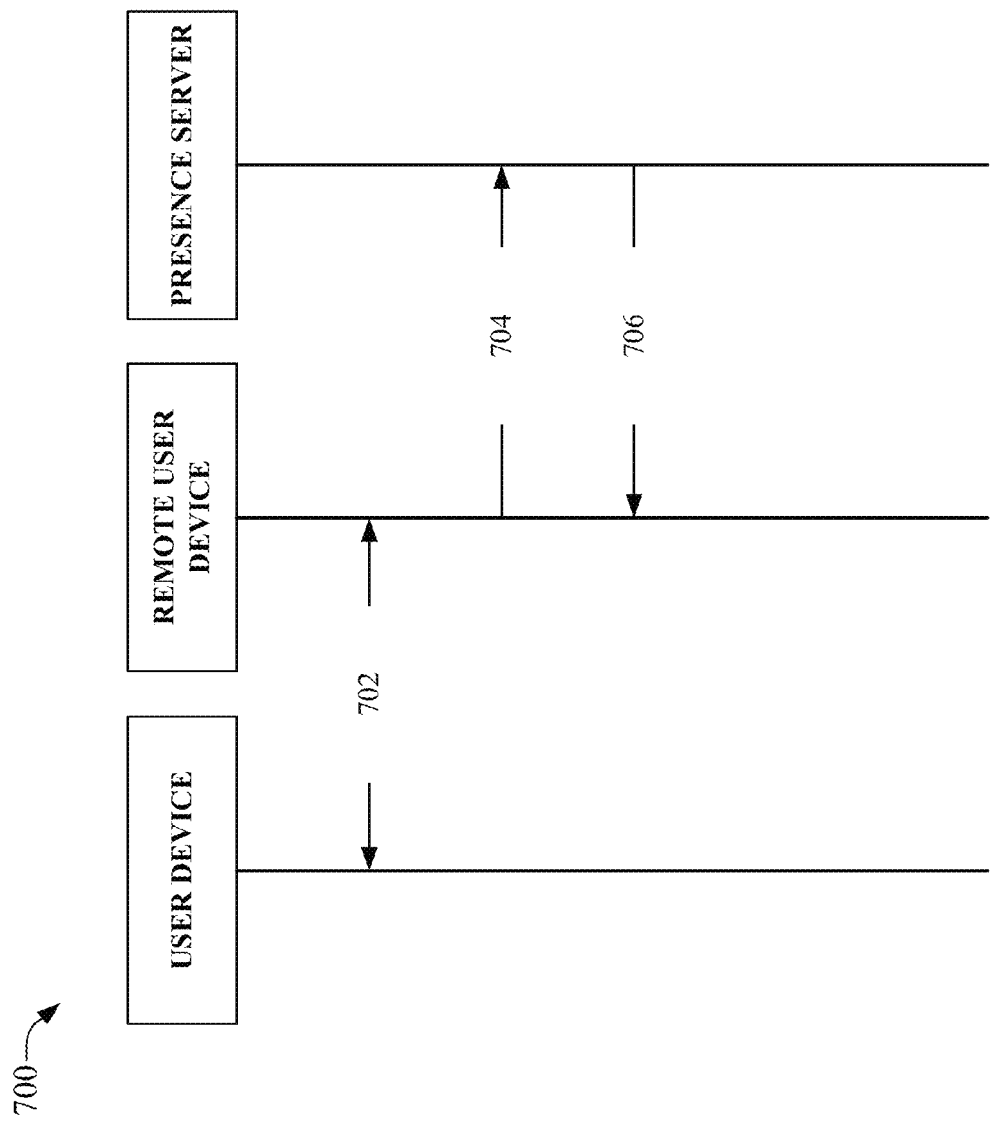
FIG. 7 provides illustration of a another flow diagram or chart for providing a presence-based capability discovery mechanism for in-call services, in accordance with aspects of the subject disclosure.

FIG. 7 depicts another flow 700 that can represent actions that can take place between a user device (e.g., user device 102), a remote device, and a presence server device (e.g., server device 104), in accordance with an embodiment. At 702 the far end remote user device can initiate a communication with the user device. When the user device accepts the contact from the far end remote user device, the far end remote user device can generate a unique identifier comprising a concatenation of strings (e.g., In-Call-If-Match: <cid_remote device_user device>; To=<user device_puid>; From=<remote device_puid>) and then it can send this unique identifier to the presence server device. With the unique identifier, the presence server device can perform a lookup of presence tuples for the user device and the remote device (e.g., using the respective PUIDs included in the fields: "remote device_puid" and "user device_puid" as respective lookup keys). When the presence server device retrieves the presence tuples, the presence server device can associate the unique identifier with the presence tuple representing the far end remote user device and the user device.

At 704 the far end remote user device, through use of SIP subscribe transactions, can query the presence server device to determine whether or not the user device is capable of facilitating in-call services, and which (if any) in-call services are commonly supported between the far end remote user device and the user device. On determining that there exists support for a commonality of in-call facilities between the far end remote user device and the user device, the presence server device can notify both devices at 706. In response to receiving a notification at 706, both the far end remote user device and the user device can activate and/or illuminate pictograms or icons representative of in-call facilities/services that are available to both the user device and the far end remote user device.

Figure 8:
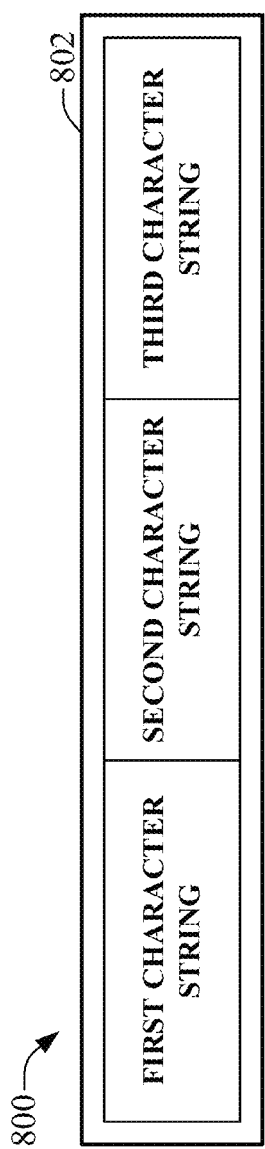
FIG. 8 provides illustrates an example concatenation of strings for providing a presence-based capability discovery mechanism for in-call services, in accordance with aspects of the subject disclosure.

FIG. 8 provides illustration 800 of an example of the described unique identifier representing a concatenation of strings 802 comprising at least a first string, and second string, and a third string. The first string can be in the form of: "CallId=cid_user device_remote device" or "CallId=cid_remote device_user device", wherein the value "cid_user device_remote device" or "cid_remote device_user device" can have been extracted from a SIP invite transaction header. The second string and third string can respectively be in the form of: "To=remote device_puid" and "From=user device_puid", wherein the respective values can have been extracted from call setup data.

Figure 9:
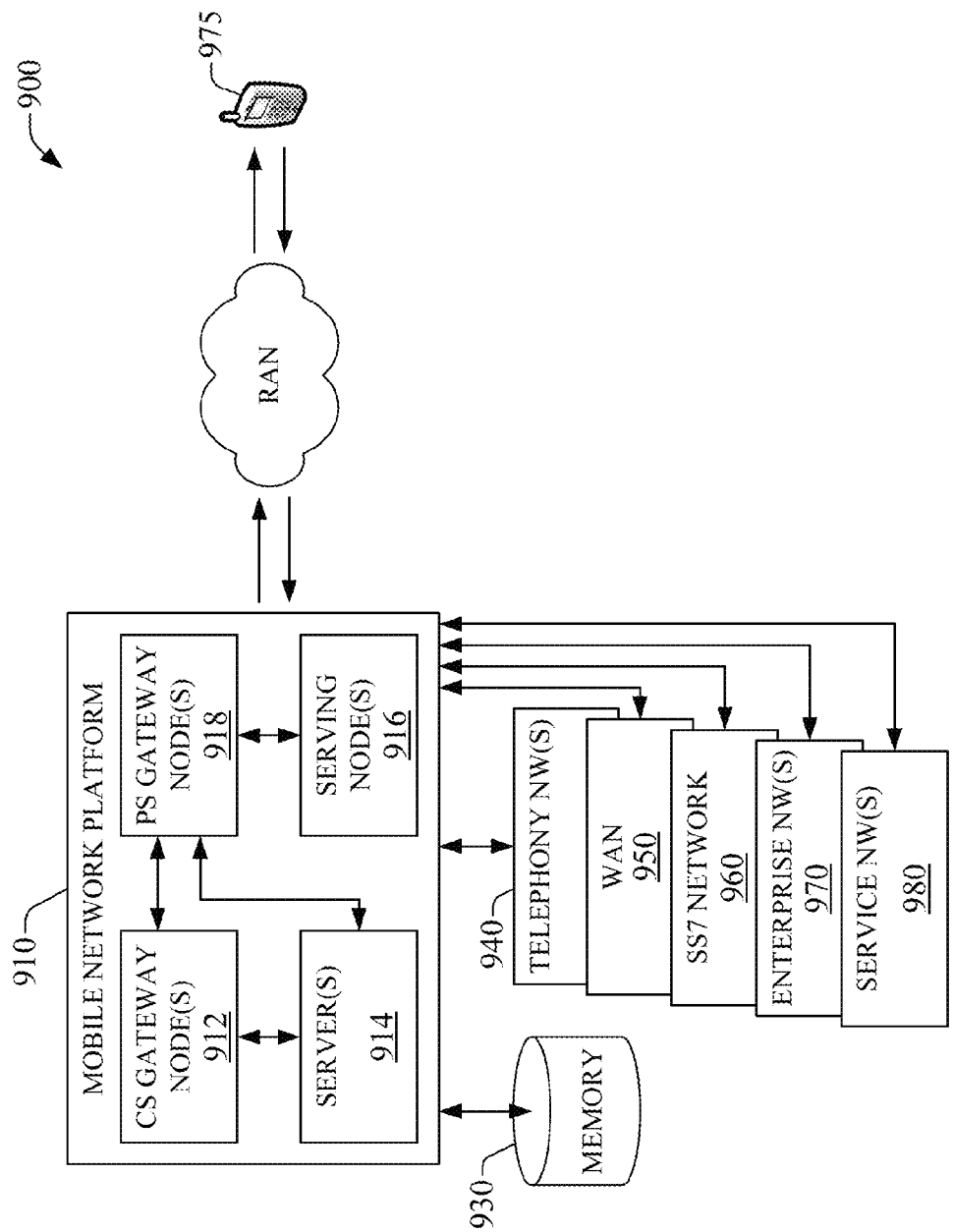
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
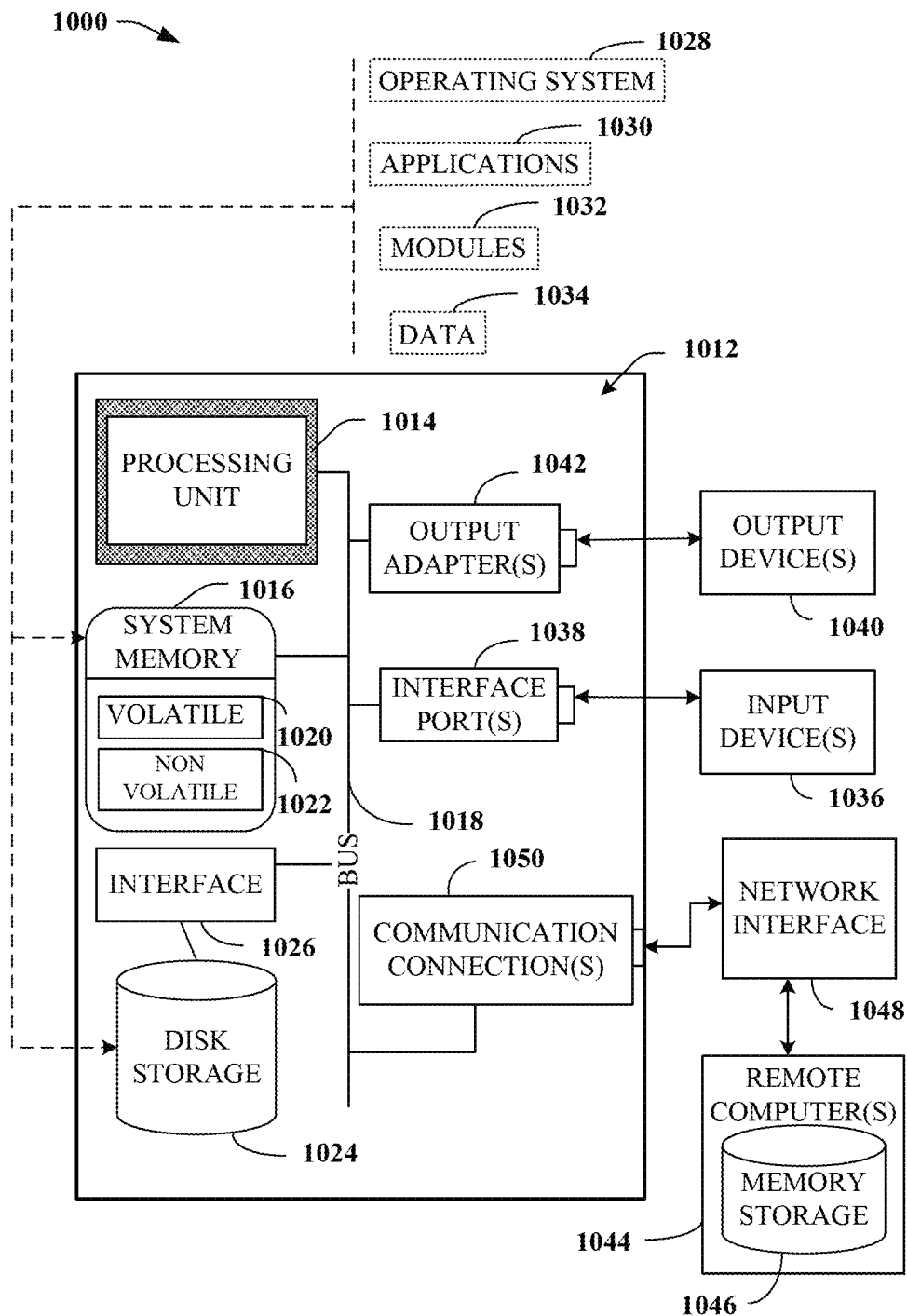
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
a processor; and
a memory that stores executable instructions that, when executed by the processor, facilitate performance of operations, comprising:
initiating a communication with a user device;
generating a unique identifier representing the communication, the unique identifier comprising a concatenation of a first string extracted from a session initiation protocol transaction header, a second string, and a third string; and
sending the unique identifier to a server device.

2. The device of claim 1, wherein the operations further comprise facilitating a lookup of a presence tuple associated with the user device as a function of a public user identity value associated with user device.

3. The device of claim 1, wherein the operations further comprise facilitating a lookup of a presence tuple associated with the device as a function of a public user identity value associated with the device.

4. The device of claim 1, wherein the operations further comprise facilitating association of the unique identifier with a presence tuple associated with the user device.

5. The device of claim 1, wherein the operations further comprise facilitating association of the unique identifier with a presence tuple associated with the device.

6. The device of claim 1, wherein the operations further comprise extracting the first string from a session initiation protocol invite transaction header.

7. The device of claim 1, wherein the operations further comprise extracting the second string and the third string from call setup data.

8. The device of claim 1, wherein the session initiation protocol transaction header initiates the communication with the user device.

9. The device of claim 1, wherein the operations further comprise facilitating activation of an icon representing an in-call service functionality that is shared between the device and the user device.

10. A method, comprising:
receiving, by a system comprising a processor, a unique identifier representing a communication between a first user device and a second user device, the unique identifier comprising a concatenation of a first string obtained from a session initiation protocol transaction header, a second string, and a third string;
as a function of the second string, performing, by the system, a look up of a first presence tuple associated with the first user device; and
associating, by the system, the unique identifier to first presence tuple.

11. The method of claim 10, further comprising as a function of the third string, performing, by the system, a lookup of a second presence tuple associated with a second user device.

12. The method of claim 11, further comprising associating, by the system, the unique identifier to the second presence tuple.

13. The method of claim 10, wherein the second string represents a first public user identity associated with the first user device and the third string represents a second public user identity associated with the second user device.

14. The method of claim 10, further comprising facilitating activation of an icon representing an in-call service functionality that is shared between the first user device and the second user device.

15. The method of claim 10, wherein the session initiation protocol transaction header facilitates receiving the unique identifier representing the communication between the first user device and the second user device.

16. A machine-readable storage medium, comprising executable instructions that, when executed by a processor, facilitate performance of operations, comprising:
initiating a communication with a user device;
generating a unique identifier representing the communication, the unique identifier comprising a concatenation of a first string extracted from a session initiation protocol transaction header, a second string, and a third string; and
sending the unique identifier to a server device.

17. The machine-readable storage medium of claim 16, wherein the operations further comprise, as a function of the second string, querying the server device to determine an existence of support for a common in-call service.

18. The machine-readable storage medium of claim 17, wherein the operations further comprise illuminating a pictogram representing the common in call service on a display device.

19. The machine-readable storage medium of claim 16, wherein the second string comprises a public user identity associated with the user device.

20. The machine-readable storage medium of claim 16, wherein the unique identifier is generates in response to receiving the session initiation protocol invite transaction header from the user device.

* * * * *